Patented Nov. 22, 1949

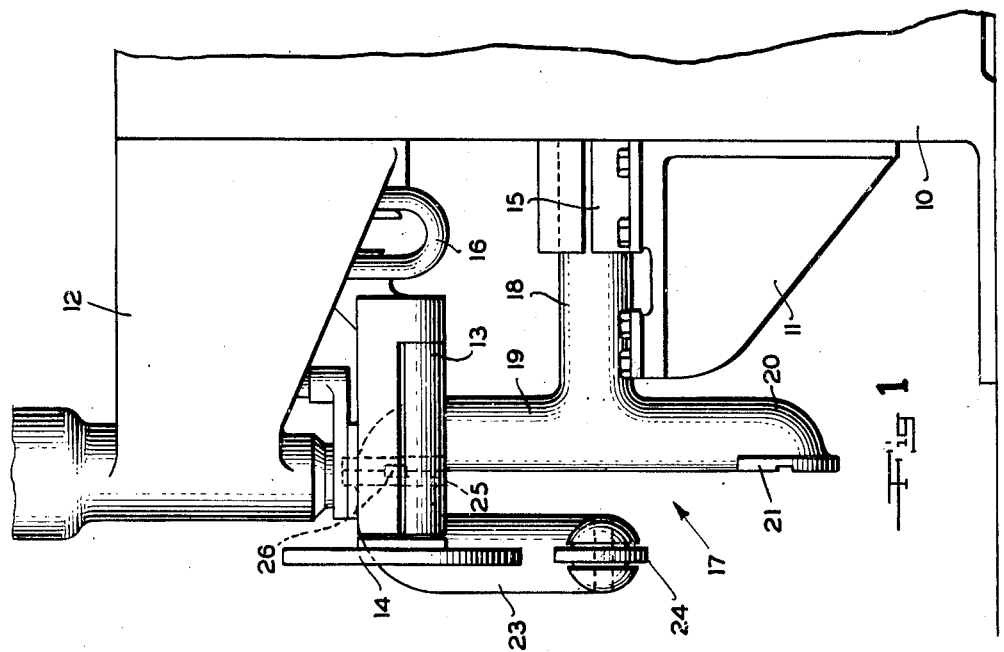
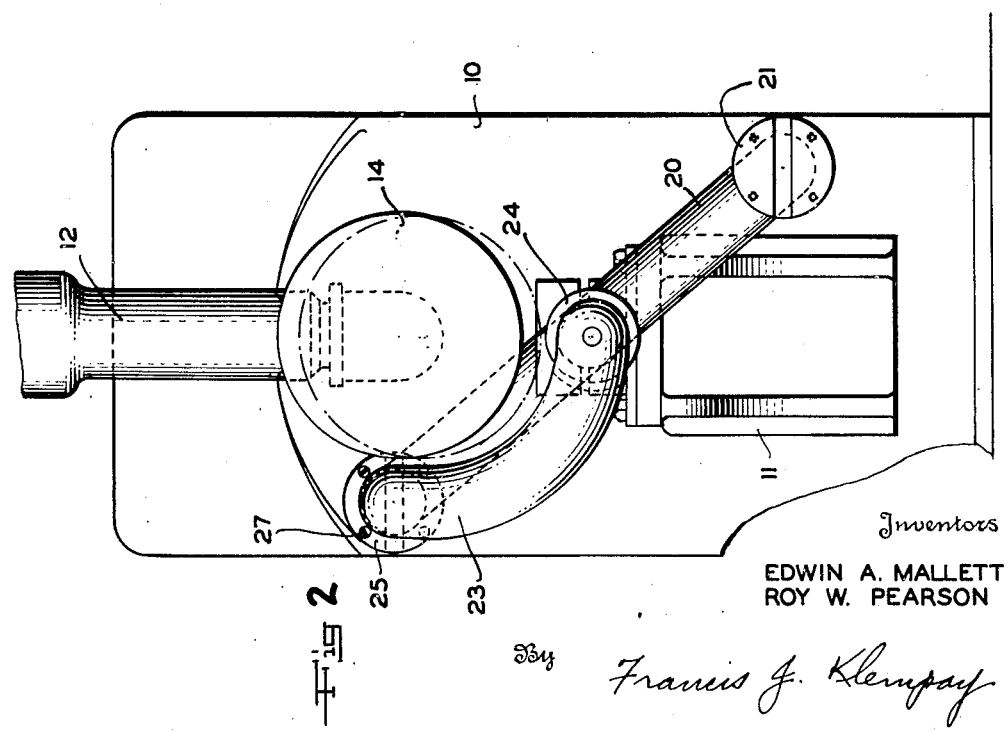

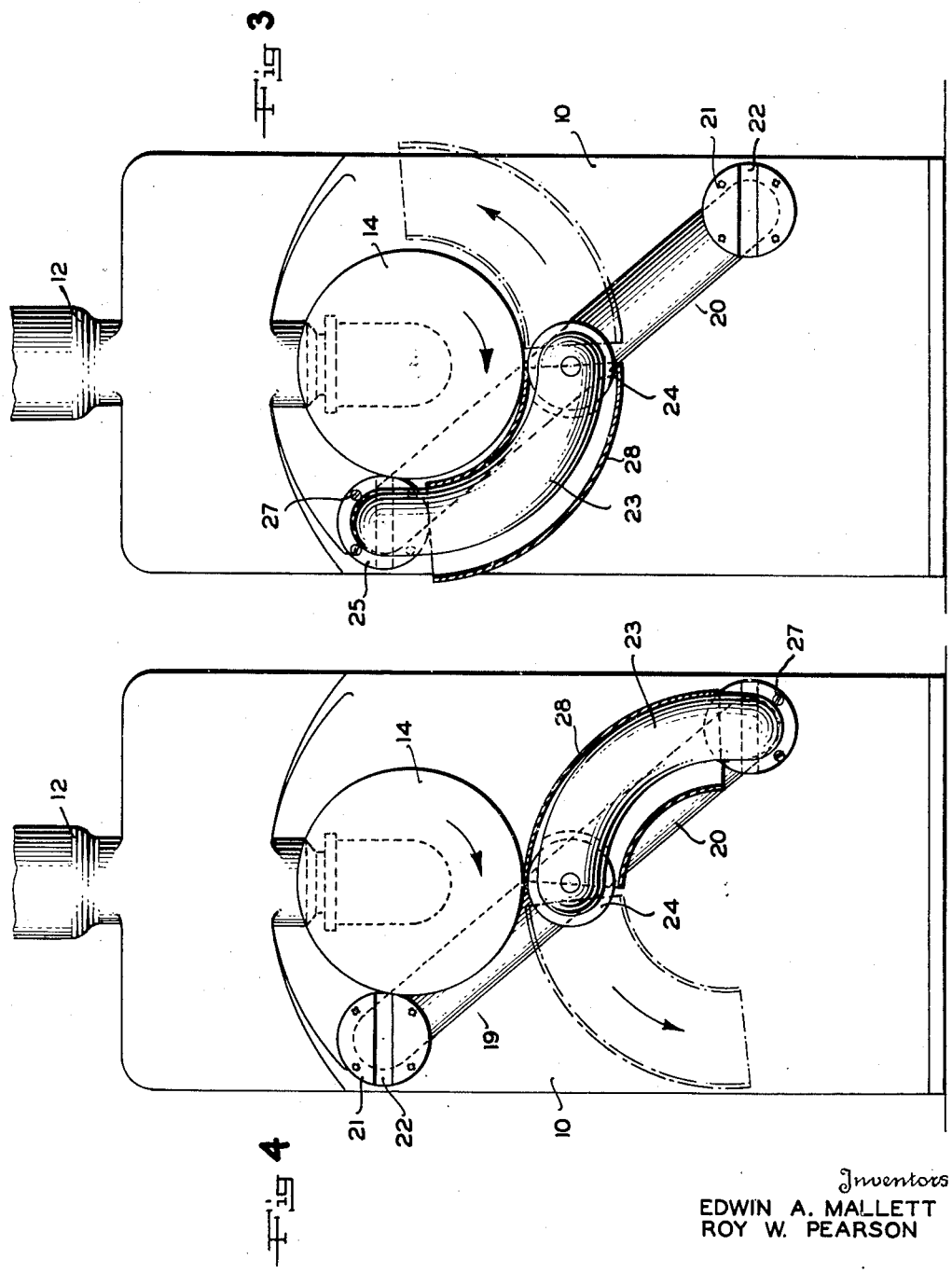

2,489,224

UNITED STATES PATENT OFFICE 2,489,224

APPARATUS FOR SEAM WELDING ELBOWS

Edwin A. Mallett and Roy W. Pearson, Warren, Ohio, assignors to The Taylor-Winfield Corporation, Warren, Ohio, a corporation of Ohio Application January 9, 1948, Serial No. 1,346

6 Claims. (Cl. 219—4)

1

This invention relates to electrical resistance welding apparatus and more particularly to an attachment for a seam welder wherein both the inside and outside curvature of a sheet metal elbow or the like may be expeditiously seam welded. The principal object of the invention is the provision of practical apparatus for fabricating, by the economical seam welding process, sheet metal elbows or other curved tubular parts from readily produced stampings which are U-shaped in cross-section. As will be understood, such stampings may be very economically produced by simple blanking and forming operations and inasmuch as the present invention provides an expeditious and economical method for fabricating the stampings into completed curved tubular elements, the invention makes possible substantial economies to be effected in the production of such curved tubular elements.

Another and more specific object of the invention is the provision of an improved horn arrangement for a seam welding machine for welding tubular articles, whereby seam welds may be readily made both along the inside and outside curvature of curved tubular bodies.

A further object of the invention is the provision in apparatus of the character outlined above of an arrangement whereby the same horn elements used in welding the outside curvature of the tubular article may be employed also for welding the inside curvature of the article.

A still further object of the invention is the provision of apparatus of the character described which is readily adapted to electric resistance seam welding apparatus of existing conventional design.

The above and other objects and advantages of the invention will become apparent upon consideration of the following detailed specification and the accompanying drawings wherein there is disclosed a preferred embodiment of the invention.

In the drawing:

Figure 1 is a side elevation of assembled apparatus constructed in accordance with the principles of our invention;

Figure 2 is a front elevation of the apparatus of Figure 1;

Figure 3 is a front elevation similar to Figure 2 but showing a piece of work in the welding throat of the apparatus at the completion of welding along the inside curvature of the piece; and, Figure 4 is a front elevation of the apparatus of Figure 1 assembled to weld along the outside curvature of a sheet metal elbow.

2

Referring to the drawing in detail, reference numeral 10 designates generally the main frame of an electric resistance welding machine having a lower knee 11 and an upper bracket 12 in which is slideably mounted a quill, not shown, for carrying a current conductive journal 13 rotatably mounting a wheel electrode 14. In accordace with usual practice, a cylinder, not shown, may be attached to the quill mentioned whereby the electrode 14 may be raised and lowered and welding pressure applied therethrough, all as will be understood by those having knowledge of electric resistance welding machines.

On the knee 11 is a current conductive pad 15 which is electrically connected with one of the terminals of the secondary of the welding transformer, not shown but normally housed in the frame 10, and the opposite terminal of such secondary is connected with the journal 13 through a flexible part 16.

The apparatus of our invention is in the nature of a specifically constructed lower horn fixture for the conventional welding machine described and as shown more clearly in Figure 1. Such fixture includes a main fitting 17 in the form of a T-shaped member, the stem 18 of which is rigidly clamped to the pad 15. The legs 19 and 20 of the fitting 17 are in alignment with each other and when properly assembled on the welding machine are biased on approximately a 45° angle, as shown in Figures 2, 3 and 4. The outer ends of the legs 19 and 20 each have a forwardly directed machined face 21, having a horizontally extending slot 22 milled therein. The fitting 17 may be constructed of a suitable copper alloy to conduct the welding current and to rigidly support the out-rigged horn and welding wheel now to be described.

Adapted to be attached to either of the faces 21 of the fitting 17 is a curved horn 23 journaling at its outer free end a wheel electrode 24. The opposite end of the horn 23 is formed with an integral rearwardly extending face 25 adapted to overlie either of the faces 21 of the fitting 17. The face 25 is formed with a horizontal slot complementary to the slots 22 and upon assembly of the parts a key 26 is inserted, partly in the face 21 and partly in the face 25, whereby the horn 23 is held in rigid non-twisting relation with the fitting 17. Cap screws 27 may be employed to detachably mount the horn 23 on the fitting 17.

By referring to Figure 1 it will be noted that the offset nature of the horn 23 enables the electrode 24 to lie in the same plane as the electrode 14 and since the horn 23 is connected only at its ends it will be obvious that an elbow or other curved tubular member may be slid over the horn 23. It should also be observed, particularly upon inspection of Figure 3 that as the elbow 28 or other work piece is slid on to the horn 23 the inner curvature of the work piece may be seam welded along a longitudinally extending seam by welding pressure applied between the electrodes 14 and 24. The application of such pressure is effected, of course, by downward movement of the electrode 14 toward the electrode 24. Upon completion of the welding cycle the electrode 14 may be retracted to the position shown in solid lines in Figure 2 whereupon the welded work piece may be removed from the horn 23 by outward sliding movement as indicated by the lower arrow in Figure 3.

To arrange the apparatus for seam welding the outer curvature of the work piece 28, the horn 23 is removed from the upper of the faces 21 of the fitting 17 and is attached to the lower of these faces 21 in the position shown in Figure 4. Again, a key is inserted to span the horizontally disposed slots in the faces 21 and 25 and cap screws 27 are utilized to rigidly mount the horn 23, so that the horn 23 will be effectively restrained against downward tilting movement even though it is mounted only at its lower end. This reversal of the horn 23 again locates the welding wheel 24 directly below the welding wheel 14 but with the horn in this position the outer curvature of the work piece 28 will pass between the wheels 14 and 24 as the work piece is slid off the horn 23.

In operating the apparatus when arranged as in Figure 4 the welding wheel 14 is first retracted to allow the pre-assembled but unwelded elbow to be loaded on to the horn 23 in the manner shown in full lines in Figure 4. The electrode 14 may now be moved downwardly and welding pressure applied therethrough so that upon subsequent rotation of the wheel 14 in the direction indicated in Figure 4 the outer curvature of the work piece 28 will be caused to pass between the wheels 14 and 24 whereby a seam weld may be effected in the outer curvature of the work piece. In actual practice, suitable means, not shown, will be employed to drive the electrode 14 and such driving means will be employed in either set-up of the apparatus.

Regardless of whether the elbow is first welded along its inner radius or its outer radius it is preferable that the two stamped halves of the elbow be first preassembled and this is preferably accomplished by tacking the two halves together by spot welding, for example, whereby the work passes between the wheels 14 and 24 in overlapped relation suitable for seam welding as will be understood in the art.

An important advantage of the apparatus of our invention, quite aside from its ability to seam weld along either the inner or outer radius of an elbow, is that the principal component of the apparatus may be utilized for welding a large variety of products. For example, the horn 23 may be made in a wide variety of sizes and shapes to accommodate products of different dimensions and form. The fitting 17 may be more or less standardized and permanently mounted on the welding machine while various styles and designs of horns 23 are utilized. Also, through the use of the design described and illustrated but one single part need be changed to weld either the inner or outer radius of a curved tube and this part is of minimum dimension so that it may readily be handled by the machine operator.

It should now be apparent that we have provided an improved method and apparatus for fabricating sheet metal elbows and the like which accomplishes the objects initially set out. Through the use of a single conventional welding machine and a simple yet rugged and durable attachment therefore we can readily employ such machine for a wider variety of uses, including the seam welding of a sheet metal elbow along both its inner and outer curvatures or radii.

The above specifically described embodiment of the invention should be considered as illustrative only as obviously many changes may be made therein without departing from the spirit or scope of the invention. Reference should therefore be had to the appended claims in determining the scope of the invention.

We claim:

1. An attachment for an electric resistance seam welder having a rotary electrode and a current-conductive support spaced therefrom, comprising a current-conductive fitting adapted to be rigidly attached to said support and having legs extending on opposite sides of the axis of rotation of said electrode and outwardly of the periphery of said electrode, said legs being offset with respect to the plane of rotation of said electrode, a horn adapted to be detachably mounted at one of its ends on the outer free end of either of said legs, said horn having a curved portion lying substantially in said plane of rotation, and a second rotary electrode journaled in the outer free end of said horn and rotatable in said plane of rotation.

2. Apparatus according to claim 1 further including a slot in the horn attaching face of each of said legs, a slot in the attaching face of said horn, and a key adapted to be inserted in the mating slots of said faces when said horn is secured to said fitting to prevent rotational movement of said horn about its point of attachment to said fitting.

3. An attachment for an electric resistance seam welder having a rotary electrode and a current-conductive support spaced therefrom comprising a current-conductive fitting adapted to be rigidly attached to said support and having a pair of horn mounting portions positioned on opposite sides of the axis of rotation of said electrode and outwardly of the periphery of said electrode, a horn adapted to be detachably mounted to either of said mounting faces and having a curved projecting portion lying substantially in the plane of rotation of said electrode, and a second rotary electrode journaled in the outer free end of said horn and rotatable in said plane of rotation.

4. Apparatus according to claim 3 further characterized in that when said horn is mounted on one of said portions the curvature of said horn is substantially concentric about said axis of rotation but when said horn is attached to the other of said portions said horn curves outwardly and away from the curvature of the periphery of said first-mentioned rotary electrode.

5. An attachment for an electric resistance seam welder having a rotary electrode and a current-conductive support spaced therefrom comprising a current-conductive fitting adapted to be rigidly attached to said support and having a pair of spaced horn attaching portions thereon, a curved horn adapted to be rigidly connected at one of its ends with either of said portions, a second rotary electrode journaled in the opposite end of said horn and adapted to rotate in the plane of rotation of said first-mentioned rotary electrode, one of said mounting portions being adjacent the periphery of said first-mentioned electrode while the other of said mounting portions is spaced far outwardly from said periphery whereby said horn may be employed to seam weld along either the inner radius or the outer radius of a pipe elbow positioned thereon.

6. Apparatus for seam welding a pipe elbow or the like comprising a rotary welding electrode, a curved current-conductive horn mounted adjacent said electrode and adapted to receive said pipe elbow, and a second rotary electrode journaled in the outer free end of said horn.

EDWIN A. MALLETT.
ROY W. PEARSON.

REFERENCES CITED

The following references are of record in the file of this patent:

UNITED STATES PATENTS

| Number | Name | Date |
| --- | --- | --- |
| 1,315,239 | Pierce et al. | Sept. 9, 1919 |
| 2,329,938 | Ortiz | Sept. 21, 1943 |